Figure 1:
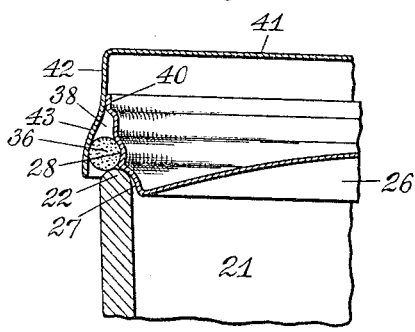

No. 819,234. PATENTED MAY 1, 1906.
W. A. LORENZ.
HERMETIC CLOSURE FOR RECEPTACLES.
APPLICATION FILED FEB. 15, 1904.

2 SHEETS—SHEET 1.

Witnesses:
H. Mallner
Jas. H. Green

Inventor
William A. Lorenz
By Wm H Honiss, Att'y.

No. 819,234. PATENTED MAY 1, 1906.
W. A. LORENZ.
HERMETIC CLOSURE FOR RECEPTACLES.
APPLICATION FILED FEB. 15, 1904.

2 SHEETS—SHEET 2.

Witnesses:
H. Mallner
Jas. W. Green

Inventor
William A. Lorenz
By Wm H Howiss. Atty.

UNITED STATES PATENT OFFICE.

WILLIAM A. LORENZ, OF HARTFORD, CONNECTICUT.

HERMETIC CLOSURE FOR RECEPTACLES.

No. 819,234.  Specification of Letters Patent.  Patented May 1, 1906.

Application filed February 15, 1904. Serial No. 193,705.

*To all whom it may concern:*

Be it known that I, WILLIAM A. LORENZ, a citizen of the United States, and a resident of Hartford, in the county of Hartford and State of Connecticut, have invented certain new and useful Improvements in Hermetic Closures for Receptacles, of which the following is a full, clear, and exact specification.

This invention relates to improvements in closures for the hermetic sealing of tumblers and other plain-rimmed receptacles.

The present closure-joint now commonly used for hermetically sealing jars is that in which the cap is of a flaring form where it engages with the sealing-gasket, the latter being supported upon a shoulder or in a groove provided for it below the level of the rim of the jar and upon the inner or outer surface thereof, according as an internal or external cap is to be used. In either case, however, the shoulder unfits the receptacle for many subsequent household uses which might be served by a tumbler or mug or cup having a plain rim; but the difficulty of employing these plain-rimmed receptacles in connection with a flaring cap and gasket has been that they afford no means for receiving and maintaining the cap or gasket in correct position upon the rim of the receptacle during the sealing operation. In the present invention this difficulty is met by providing a separate support for the gasket which serves to centralize the gasket with that portion of the rim of the tumbler at which the seal is to be made and when used in coöperation with the flaring cap performs also the function of centralizing the cap with the gasket and tumbler in their desired relative positions, so that the gasket when pressed down by the cap cannot escape being carried to and across the particular zone at which the sealing-pressure is to be applied, thus making a reliable joint-closure upon the plain rim of the tumbler. This support also establishes a level or parallel relation of the cap and gasket with that portion of the tumbler-rim on which the gasket is to be seated and compressed, which is an important feature in a closure of this character.

Although this invention may be adapted to the sealing of any suitable plain-rimmed receptacle and be used for establishing the sealing zone upon any portion of the rim thereof, it is here shown as applied to the sealing of an ordinary glass tumbler as a good example of a receptacle well adapted to a variety of household uses after its original purpose as a sealed package has been served.

The invention is also shown herein in connection with the use of a flaring cap, compressing and wedging the gasket upon an outer edge or zone of the rim of the tumbler.

Figure 2:
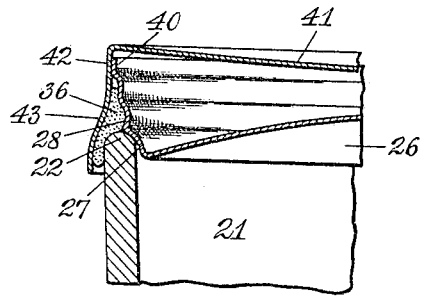
Figure 3:
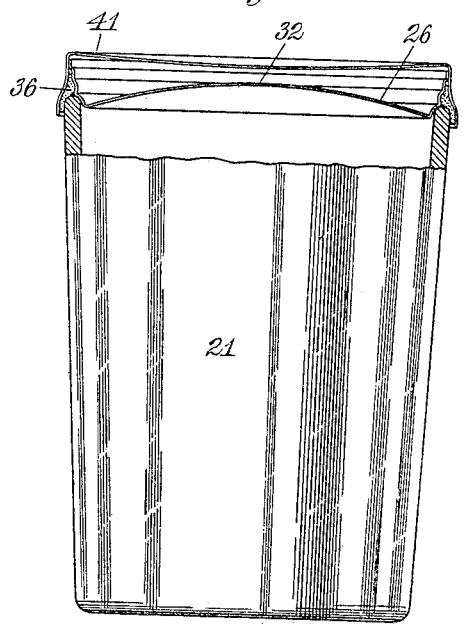
Figure 4:
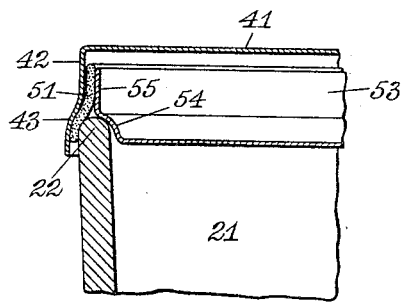
Figure 5:
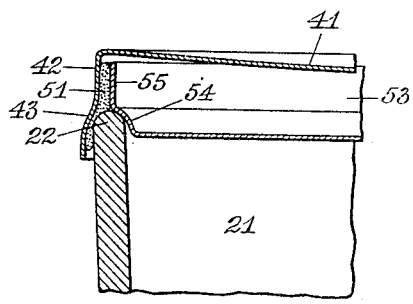
Figure 6:
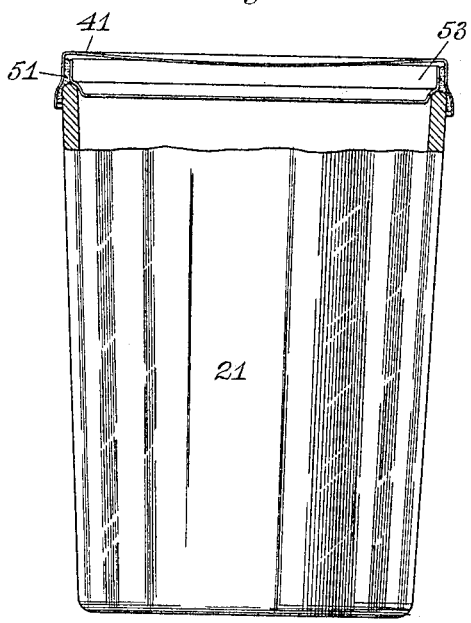

Figures 1 and 2 of the drawings are enlarged fragmentary side views in section of a tumbler, its gasket, cap, and support, Fig. 1 showing the latter in the position occupied by them during the air expelling or exhausting operation, while Fig. 2 shows the cap pushed down to its sealed position. Fig. 3 is a side view, partially in section, of a tumbler with cap and gasket in their sealed condition. Figs. 4, 5, and 6 are views corresponding to Figs. 1, 2, and 3 and show modified forms of caps, gaskets, and supports.

The gasket-support is preferably made in a capped or dished form, which is adapted to rest upon the tumbler so as to centralize itself therewith to receive the gasket and support it in proper sealing relation to the predetermined edge or zone of the tumbler-rim and to centralize the outer or sealing cap with the gasket and tumbler.

In the embodiment of this invention shown in Figs. 1, 2, and 3 the gasket-support 26 has a supporting and centralizing shoulder 27, which is adapted to rest upon the inner edge of the tumbler-rim and preferably conforms approximately thereto. The peripheral gasket-seat 28 conforms approximately to the contour of the gasket and supports the gasket above and concentrically with that portion of the rim of the tumbler upon which it is desired to compress it by the sealing operation. The contour of the cap and support above the gasket-seat is preferably shaped so as to leave a recess 38 immediately above the body of the gasket, and thereby avoid such a degree or extent of direct downward pressure upon the top of the gasket as might interfere with the downward travel of the cap. The upper portion 40 of the gasket-support is when employed with the form of cap and gasket shown in Figs. 2 and 3 adapted to approximately fit the interior wall 42 of the cap, so as to centralize that cap with the gasket and with the tumbler. The flaring portion 43 of the cap 41 rests upon the gasket 36 and serves to compress the gasket upon the outer rim of the tumbler and wedge it against that rim, as shown in Figs. 2 and 3.

The modifications shown in Figs. 4, 5, and 6 are adapted to employ a flat gasket 51, either cylindrical or conical. The gasket-support 53 in this case consists of a substantially cylindrical portion 55 and a grooved or flaring portion 54, which rests upon the rim 22 of the tumbler 21 and projects far enough below the inside of that edge to serve for centralizing. The gasket 51 is stretched over the edge of the tumbler and over the support 53, and the outer cap 41 when placed in position will then be centralized by its straight portion 42 approximately fitting the upper portion of the gasket 51. After the exhaustion of the air the cap is forced down toward the rim of the tumbler, its flaring edge wedging the gasket against the rim, and thereby making and maintaining the seal.

The gasket-support also serves more or less, according to its shape and the material of which it is made, to reinforce the rim of the receptacle, thereby helping the latter to better withstand the inward pressure from the sealing operation and reducing somewhat the chances of breakage through accident or careless handling.

Any of these gasket-supports may be provided with a hole 32, as shown in Fig. 3, to permit the escape of the air during the exhausting operation, and this central portion may be concaved to increase the cubic contents of the jar. The supports serve as inner covers, so that the contents of the jar will not come in contact with the gasket or with the outer metallic cap, or the central portion may be omitted, thus making the support ring-shaped.

These supports may be made of waterproofed paper, glass, sheet metal, or other suitable material, the thickness and contour being suitably adapted to the material employed and adapted to the manufacturing processes or methods found preferable for the making of the supports. When made of sheet metal, the metal should be non-corrosive—as, for example, of aluminium—or should be protected from corrosion by suitable lacquer or enamel.

In order to secure the preferred wedging action, the gasket should be supported in suitable relation to that side of the edge of the tumbler against which it is to be wedged by the cap. For the sealing of tumblers and other plain-edge receptacles made of glass and similar brittle material it is considered preferable to apply the wedging action upon the outer edge of the rim of the tumbler by employing a flaring cap of the general form shown in the drawings, since the wedging action of such a closure-joint is inward, tending to compress the material. Hence for the sealing of tumblers and similar plain-edge receptacles made of glass the gasket-support is preferably made of a size and contour suitable for supporting the gasket adjacent to the outer edge, as shown in Figs. 1 and 4, in order that the gaskets when pressed down by their respective caps shall be carried down and around the outer edge of the tumbler far enough to carry the edge of the gasket fully to or across the zone at which the flaring rim of the cap approaches closest to the edge of the tumbler, at which closest point the wedging action takes effect, as shown in Figs. 2 and 5. The space 38 above the gasket allows the cap to move downwardly to its sealing position without being impeded by direct downward pressure upon the top of the gasket.

These closures may be made and completely assembled for use independently of the receptacles upon which they are to be employed, being preferably applied thereto after the receptacles are filled. This enables the receptacles to be examined after they are filled, so as to make sure that the rims are not smeared with the contents of the jar while filling it, which is likely to happen in the haste usually attendant upon such filling operations and which when it happens is liable to impair the reliability of the seal and sometimes prevents it from sealing by preventing perfect contact between the cap, the gasket, and the receptacle-rim.

I claim as my invention—

1. The combination with a plain-rimmed receptacle and a gasket, of a flaring cap for compressing the gasket at an inclination against an edge of the receptacle-rim, and a gasket-support separate from the cap provided with means for positioning the gasket in sealing relation to the said edge of the receptacle-rim.

2. The combination with a plain-rimmed receptacle, a gasket and a flaring cap, of a support provided with means for supporting the gasket and cap in wedging relation to an edge of the rim of the receptacle.

3. The combination with a plain-rimmed receptacle and a gasket, of a flaring cap for compressing the gasket inwardly against the outer edge of the receptacle-rim, of a gasket-support provided with means for supporting the gasket in sealing relation to the said outer edge of the receptacle-rim, and provided with means for guiding the cap in concentric relation to the gasket and receptacle during the downward sealing movement of the cap.

4. The combination with a hermetically-sealed receptacle having a rounded rim, and having its gasket compressed with a wedging action against an outer zone of the said rim, of an inner cover for the receptacle, provided with means for supporting the gasket in sealing relation to the said outer zone of the rounded rim of the receptacle.

5. The combination with a receptacle having a rounded rim, a gasket, an outer sealing-cap provided with a flaring rim for compressing the gasket inwardly and downwardly against an outer zone of the rounded rim of the receptacle, of a separate inner cover for the receptacle, provided with means for supporting the gasket, and with means for supporting the cap in sealing relation to the said outer zone of the receptacle-rim.

6. The combination with a receptacle having a rounded rim, of a gasket, an outer sealing-cap provided with a flaring rim for compressing the gasket downwardly and inwardly against an outer zone of the receptacle-rim, and a gasket-support provided with an annular groove for supporting the gasket in sealing relation to the said outer zone of the receptacle-rim.

7. The combination with a plain-rimmed receptacle and a gasket, of a flaring cap and a separate gasket-support having a recess over the gasket between the contours of the cap and support.

8. A closure for receptacles comprising a gasket, and two separate caps provided with flaring flexible rims, one of said caps being inverted within the other cap with the adjacent sides of their respective rims forming the upwardly-converging walls of a downwardly-facing annular groove, for positioning the gasket in sealing relation to the outer edge of the receptacle-rim.

In testimony whereof I have signed my name to this specification in the presence of two subscribing witnesses.

WILLIAM A. LORENZ.

Witnesses:
 JAS. W. GREEN,
 NELLIE PHOENIX.